(12) United States Patent
Rodriguez

(10) Patent No.: US 9,433,192 B2
(45) Date of Patent: Sep. 6, 2016

(54) PET ENTERTAINMENT APPARATUS

(76) Inventor: Duniesqui Rodriguez, New Port Richey, FL (US)

( * ) Notice: Subject to any disclaimer, the term of this patent is extended or adjusted under 35 U.S.C. 154(b) by 597 days.

(21) Appl. No.: 11/763,890

(22) Filed: Jun. 15, 2007

(65) Prior Publication Data

US 2008/0149043 A1    Jun. 26, 2008

Related U.S. Application Data

(60) Provisional application No. 60/833,852, filed on Jul. 28, 2006.

(51) Int. Cl.
*A01K 15/02* (2006.01)
*A01K 29/00* (2006.01)

(52) U.S. Cl.
CPC .................................. *A01K 15/025* (2013.01)

(58) Field of Classification Search
USPC ....... 119/702, 703, 704, 706, 707, 708, 709, 119/710, 711; 446/23, 217, 218; 74/87, 74/572.2, 572.21
See application file for complete search history.

(56) References Cited

U.S. PATENT DOCUMENTS

| 1,863,587 | A | * | 6/1932 | Arnold ............................ 446/23 |
| 2,797,510 | A | * | 7/1957 | McLarty ......................... 40/440 |
| 4,565,502 | A | * | 1/1986 | Sell ................................ 417/334 |
| 6,058,887 | A | * | 5/2000 | Silverman ..................... 119/609 |
| 6,412,443 | B1 | * | 7/2002 | Miller ............................ 119/704 |
| 6,957,946 | B1 | * | 10/2005 | Vander Kley .................. 415/4.2 |
| 6,971,332 | B2 | * | 12/2005 | Woltmann et al. ........... 119/467 |

* cited by examiner

*Primary Examiner* — Michael R Mansen
*Assistant Examiner* — Monica Williams

(57) ABSTRACT

Pet entertainment apparatus having a rotating portion with a lure rotatably attached to a base portion.

14 Claims, 4 Drawing Sheets

PET ENTERTAINMENT APPARATUS

RELATED APPLICATIONS

The present patent document claims the benefit of the filing date under 35 U.S.C. §119(e) of Provisional U.S. Patent Application Ser. No. 60/833,852, filed Jul. 28, 2006, which is hereby incorporated by reference.

BACKGROUND

1. Technical Field

The present invention relates to an apparatus for entertaining animals, and in particular, domesticated animals such as cats.

2. Background Information

In general, Americans love pets, and especially cats. The American Pet Products Manufacturer's Association's ("APPMA") 2007/2008 Pet Owner's Survey indicates that over 88 million cats are owned in the United States alone. Moreover, Americans splurge on their cats. The same APPMA survey indicates that cat owners spend a yearly average of $26.00 on toys for their cat(s). Accordingly, an entire industry furnishes cats with toys and accessories. These toys and accessories span from luxurious (rhinestone tiaras for feline divas) to silly (dress your pet to impress with a teeny tiny Fez hat) to the simply bizarre (the Kitten Mitten™).

One subset of the toy and accessory market is aimed at toys for entertaining cats with an otherwise boring, sedentary lifestyle, or kittens that are on the prowl for a good time. Such toys include catnip toys, interactive toys, scratching posts, and soft plush toys. All of these toys, however, suffer from a number of drawbacks. One specific drawback of known toys is the problem of keeping a cat, and to an even greater degree a fun-hungry kitten, entertained for an extended period of time. That is, many conventional cat toys are simply boring to cats and kittens. Another drawback of known toys is that they can be complicated, high technology toys that require break or require batteries or another type of power supply in order to function. One such toy is described in U.S. Pat. No. 6,892,675.

BRIEF SUMMARY

The present invention improves or resolves many of the drawbacks set forth above by providing a persistently alluring toy for cats and other pets.

One embodiment of a pet entertainment apparatus includes a wheel adapted to rotate about an axis. The wheel has a first half and a second half. The first half is heavier than the second half so as to cause the wheel to be biased toward a neutral position. A lure is affixed to the second half of the wheel. The wheel is connected to a stand, which is affixed to a base.

Another embodiment of a pet entertainment apparatus includes a wheel adapted to rotate about an axis, the axis being offset from a central axis of the wheel.

DETAILED DESCRIPTION OF THE DRAWINGS AND THE PRESENTLY PREFERRED EMBODIMENTS

Figure 1:
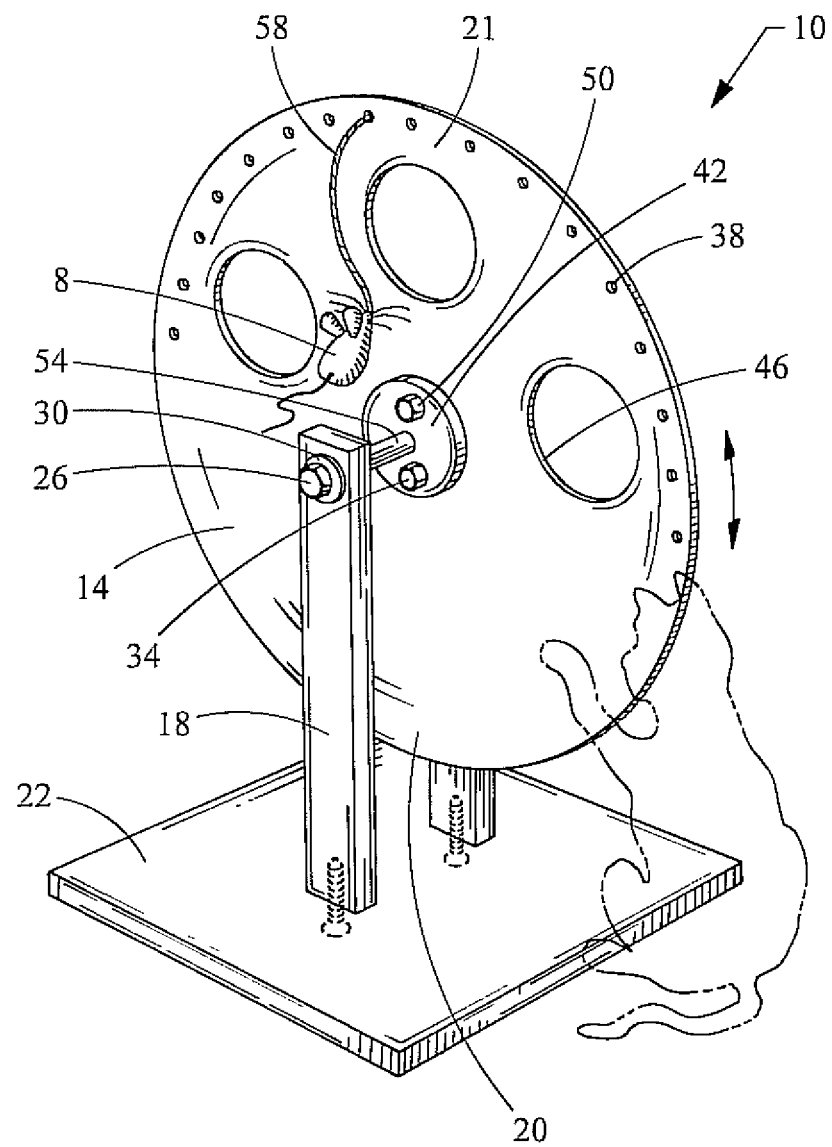
FIG. 1 is a perspective side view of a pet entertainment apparatus according to one embodiment of the present invention.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings. It should also be understood that the drawings are not to scale and in certain instances details have been omitted, which are not necessary for an understanding of the present invention, such as conventional details of fabrication and assembly.

Referring to the figures, FIGS. 1~4 illustrate a pet entertainment apparatus 10 according to one embodiment of the present invention. In general, pet entertainment apparatus 10 includes rotating wheel 14, posts 18 to support wheel 14, base 22, and a lure 8. In use a cat or other animal pursues and grabs lure 8. As a result, wheel 14 is rotated toward the cat. When the cat releases lure 8, the wheel automatically returns to its neutral position, as illustrated in FIG. 1. This results in the lure returning to its prior position. The motion created by the return entices the cat to pursue it again.

Figure 2:
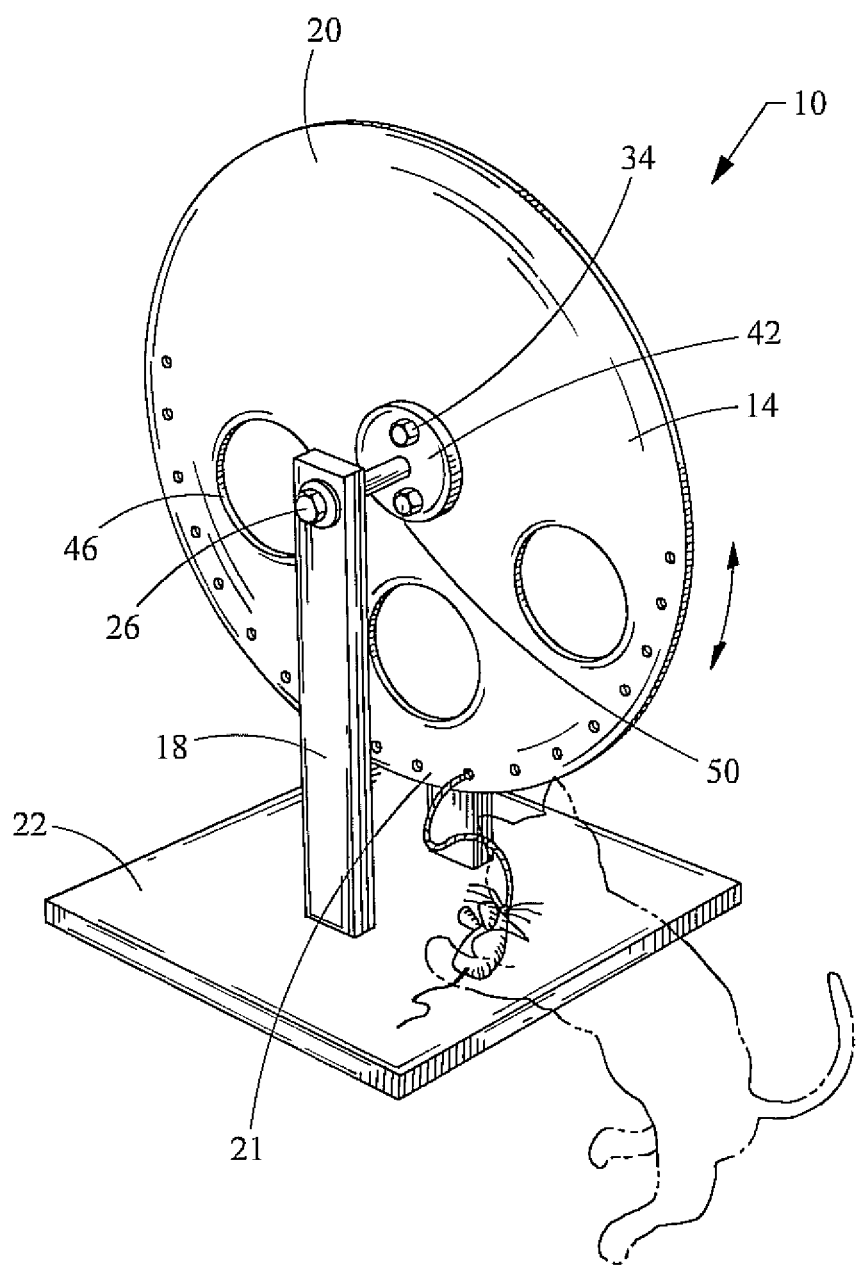
FIG. 2 is a perspective side view of a pet entertainment apparatus according to one embodiment of the present invention.
Figure 3:
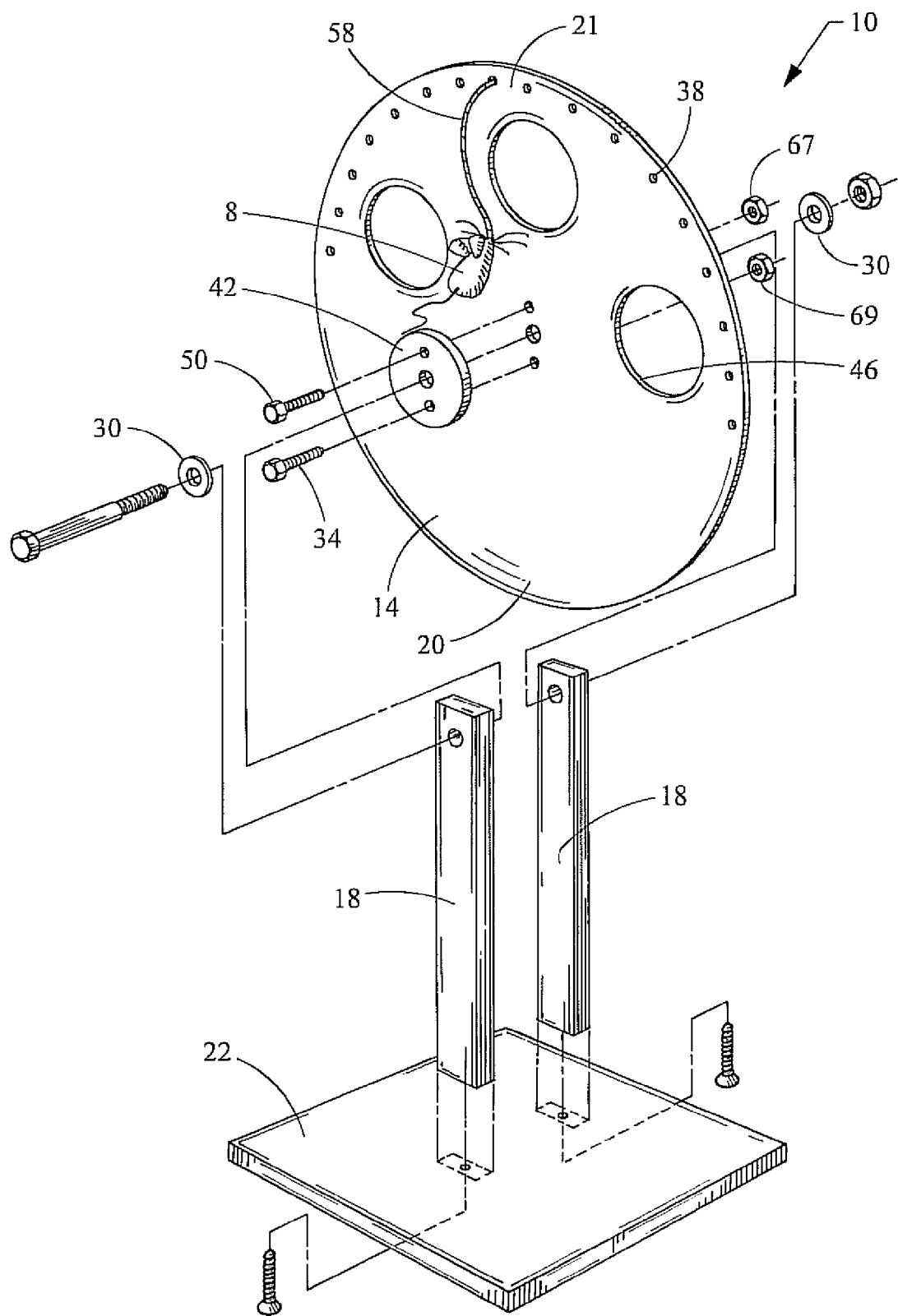
FIG. 3 is an exploded perspective side view of a pet entertainment apparatus according to one embodiment of the present invention.

As illustrated in FIGS. 1-3, pet entertainment apparatus 10 includes a wheel 14. Wheel 14 is unbalanced or weighted to bias the wheel toward a neutral position, as shown in FIG. 1. More specifically, the lower portion 20 is heavier than the upper portion. This mechanism results in an automatic wheel return mechanism. A number of wheel return mechanisms will become apparent to a person of ordinary skill in the art in view of the present disclosure. As shown in FIG. 3, wheel 14 is provided with openings or windows 46. Since windows 46 are located in the upper portion 21 of the wheel, the wheel is weighted. Alternatively, for example, the use of an offset axis through which rod 54 is inserted could also be used to create a weighted wheel effect and an automatic wheel return mechanism. Alternatively, the lower portion 20 of wheel 14 can be provided with a separate weight to also result in a weighted wheel effect. In yet another alternative, a wheel having a non-circular shape could be used. Other exemplary wheel configurations include triangular, square, or polygonal wheels, which can be rotatably mounted in an unbalanced configuration, i.e., with the wheel tending to rotate to a neutral position.

Wheel 14 is also provided with a plurality of lure attachment openings 38. In the neutral position shown in FIG. 1, lure 8 is attached to wheel 14 with a lure tie 58 and is situated on or proximate to upper portion 21 of wheel 14. Alternative lure attachment mechanisms will become apparent to one of ordinary skill in the art in view of the present disclosure. For example, hook and loop fasteners such as Velcro® could also be used to attach one or more lures to wheel 14. Wheel 14 can be finished from a wide variety of materials. For example, wheel 14 can be wooden, plastic, or metal. Wheel 14, and optionally the entire pet entertainment apparatus, can also be covered with a separate material such as carpet or cardboard to allow a cat to use it as a scratching station.

Figure 4:
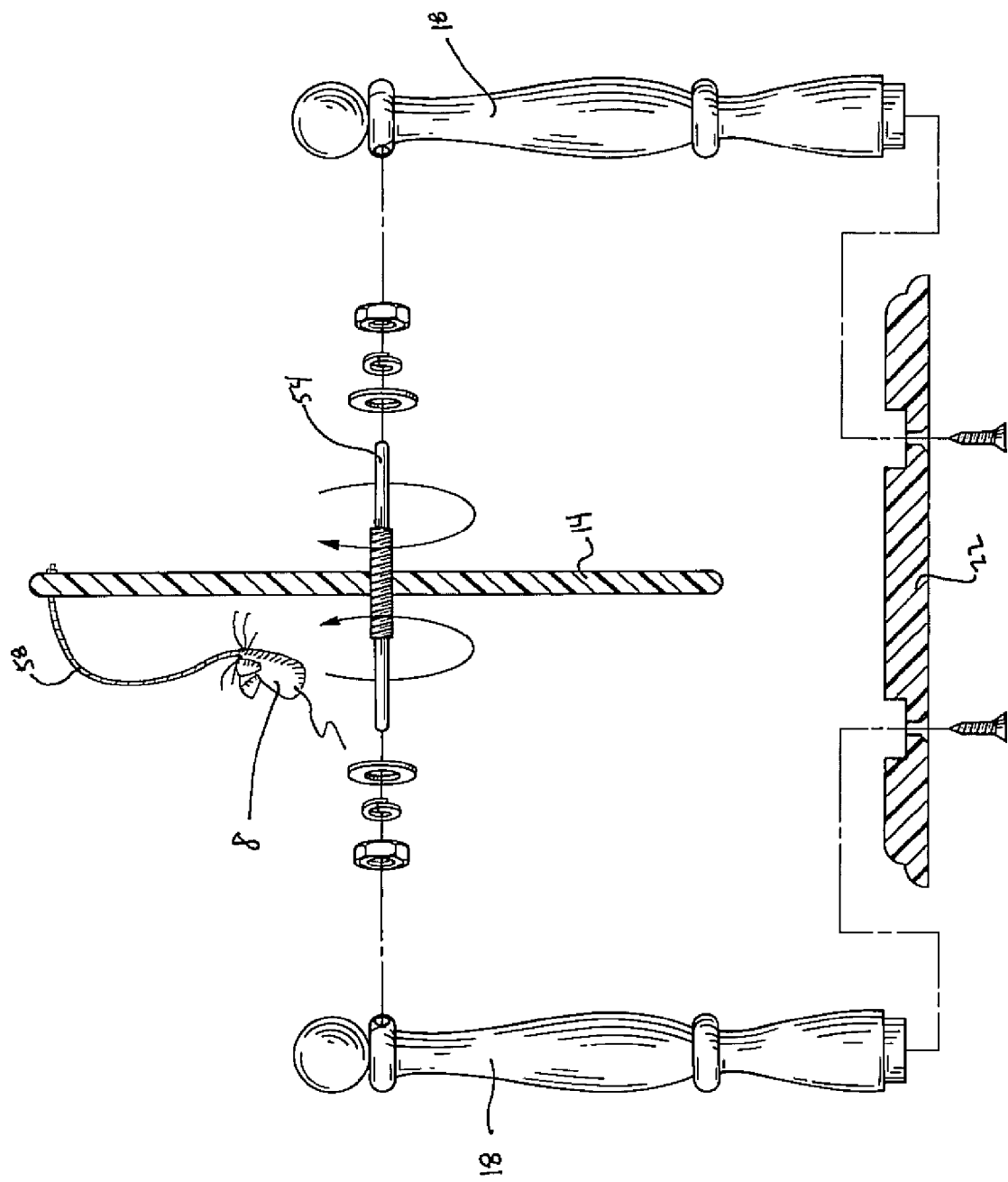
FIG. 4 is an exploded front view of a pet entertainment apparatus according to one embodiment of the present invention.

As shown in FIGS. 1-4, wheel 14 is rotatably mounted on posts 18 using a bolt, as illustrated in FIG. 3, or other axle configuration, as illustrated in FIG. 4. In particular, FIG. 1 illustrates a bolt 26 inserted through post 18. Posts 18 can be fastened to base 22 by screws, as illustrated in FIG. 4. The screws should be countersunk to ensure that the base is flat on the ground and therefore steady. Bolt 26 is secured to posts 18 with a nut and washer 30 (illustrated in FIG. 3). Additionally, wheel 14 is secured to the axle and stabilized by brace 42, bolts 34, 50, and nuts 67, 69.

As illustrated in FIG. 1, posts 18 are secured to base 22 by a fastening mechanism such as screws. Posts 18 can be rectangular (FIG. 3) or ornamental (FIG. 4). In addition, as mentioned above, posts 18 can be covered or finished in a carpet material to provide a cat scratching surface.

As illustrated in FIG. 1, lure 8 is attached to wheel 14 by lanyard 58. A wide variety of lures can be used to capture a cat's attention. For example, plush lures are one preferred embodiment. Light, sound, or smell emitting lures can also be used. For example, lures can have light emitting diodes, bells, rattles, or even catnip fillings.

In operation, a cat pursues and pounces on the lure 8. As the cat brings the lure to the ground, the wheel 14 rotates. This allows the cat (or other cats in the vicinity) to peer through the openings 46. If the cat releases the lure, the weighted wheel automatically returns to a neutral position, as illustrated in FIG. 1. This, in turn creates additional movement, which stimulates the cat to pounce on the lure again.

It is therefore intended that the foregoing detailed description be regarded as illustrative rather than limiting, and that it be understood that it is the following claims, including all equivalents, that are intended to define the spirit and scope of this invention.

What is claimed is:

1. A pet entertainment apparatus, comprising:
   a wheel adapted to rotate about a central axis, the wheel having a first half and a second half, wherein the first half is heavier than the second half, and wherein said first half is substantially free of apertures;
   a lure affixed to the second half of the wheel;
   a stand having an upper portion and a lower portion;
   a base affixed to the lower portion;
   an axle connecting the upper portion of the stand to the wheel, the axle being disposed through the central axis of the wheel.

2. The pet entertainment apparatus of claim 1, wherein the wheel further comprises a window disposed within the second half.

3. The pet entertainment device of claim 2, wherein the lure comprises a noise emitting device.

4. The pet entertainment device of claim 2, wherein the lure comprises a light-emitting device.

5. The pet entertainment device of claim 2, wherein the lure comprises a light-reflecting portion.

6. The pet entertainment device of claim 2, wherein the lure comprises a smell-emitting device.

7. The pet entertainment device of claim 2, wherein the lure comprises a catnip-emitting device.

8. The pet entertainment apparatus of claim 1, wherein the wheel further comprises a scratching material adapted to be scratched by a cat.

9. The pet entertainment apparatus of claim 8, wherein the scratching material is cardboard.

10. The pet entertainment apparatus of claim 8, wherein the scratching material is carpet.

11. The pet entertainment apparatus of claim 1, wherein the wheel is non-circular.

12. The pet entertainment apparatus of claim 11, wherein the wheel is a square.

13. The pet entertainment apparatus of claim 11, wherein the wheel is triangular.

14. The pet entertainment device of claim 1, further comprising a plurality of attachment surfaces adapted to removably secure lures.

* * * * *